United States Patent

Hugoson

[15] 3,657,884
[45] Apr. 25, 1972

[54] TRANS-NOZZLE STEAM INJECTION GAS TURBINE

[72] Inventor: Birger O. Hugoson, Wallingford, Pa.
[73] Assignee: Westinghouse Electric Corporation, Pittsburg, Pa.
[22] Filed: Nov. 20, 1970
[21] Appl. No.: 91,301

[52] U.S. Cl. .................... 60/39.55, 60/39.37, 60/39.58
[51] Int. Cl. .......................................... F02c 7/18
[58] Field of Search .............. 60/39.55, 39.58, 39.59, 39.16, 60/39.15, 37.37; 415/193

[56] References Cited

UNITED STATES PATENTS

| | | | |
|---|---|---|---|
| 2,636,345 | 4/1953 | Zoller | 60/39.55 |
| 1,726,104 | 8/1929 | Harris | 60/39.15 |
| 3,280,555 | 10/1966 | Charpentier et al. | 60/39.58 |
| 3,224,195 | 12/1965 | Walsh | 60/39.58 |
| 2,168,313 | 8/1939 | Bichowsky | 60/39.55 |
| 2,626,501 | 1/1953 | Pavlecka et al. | 60/39.15 |
| 972,642 | 10/1910 | Reed | 60/39.37 |
| 3,318,572 | 5/1967 | Scalzo | 415/193 |

FOREIGN PATENTS OR APPLICATIONS

| | | | |
|---|---|---|---|
| 283,290 | 1/1928 | Great Britain | 60/39.55 |
| 774,425 | 5/1957 | Great Britain | 60/39.58 |
| 1,196,900 | 6/1961 | Germany | 60/39.59 |

*Primary Examiner*—Mark M. Newman
*Assistant Examiner*—Warren Olsen
*Attorney*—A. T. Stratton, F. P. Lyle and F. Cristiano, Jr.

[57] ABSTRACT

In a double-opposed flow gas turbine the fuel combustion chambers are arranged generally radially in a plane normal to the rotational axis of the turbine shaft. A generally annular turbine casing has an outer annular chamber of plenum distributing compressed air to the primary zones of the combustors and an inner annular chamber supplying steam to the secondary zones of the combustors which extend through the walls defining the air and steam chambers and supporting combined transition pieces and nozzles of the combustors as well as the turbine stator rings.

12 Claims, 5 Drawing Figures

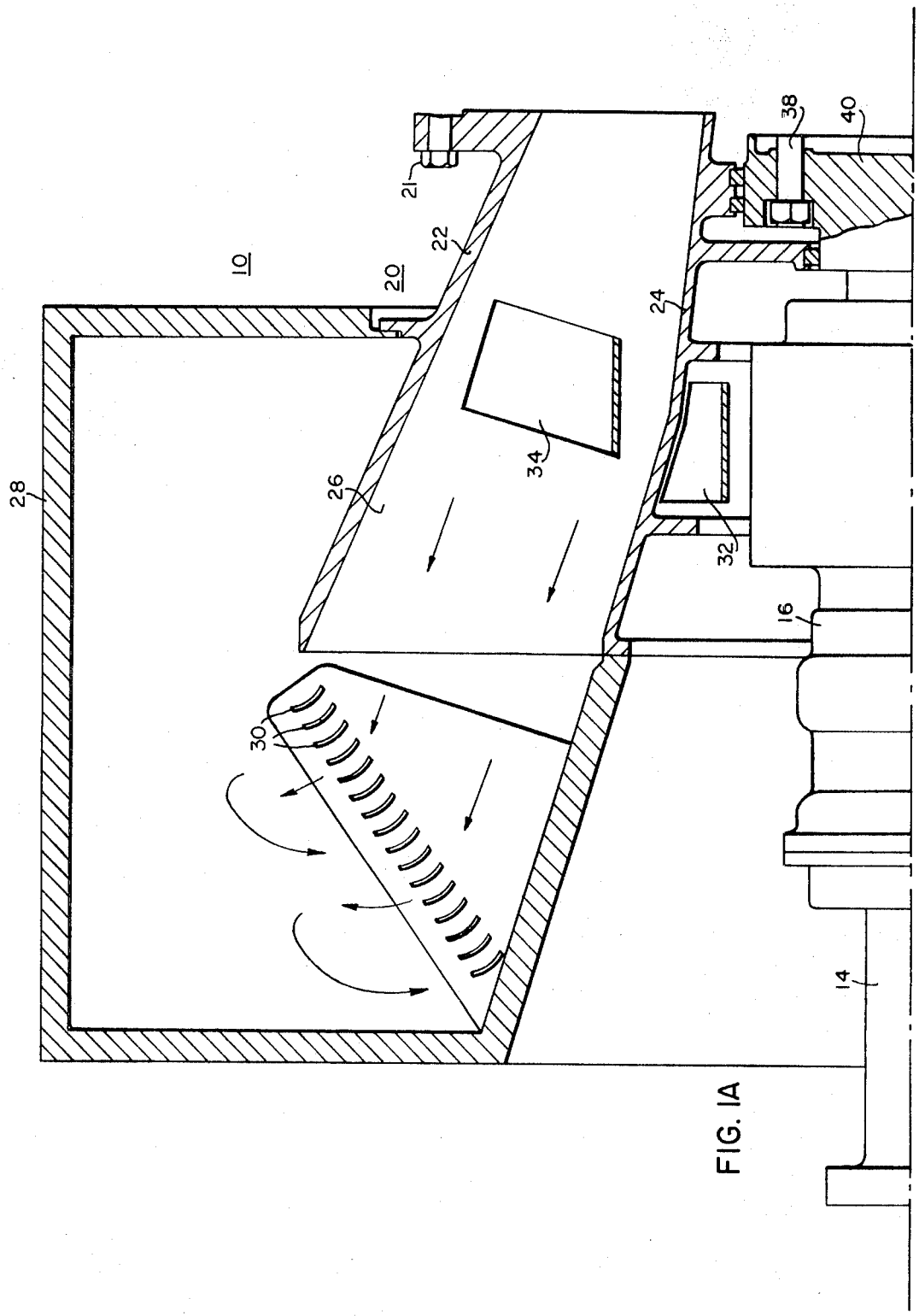
FIG. IA

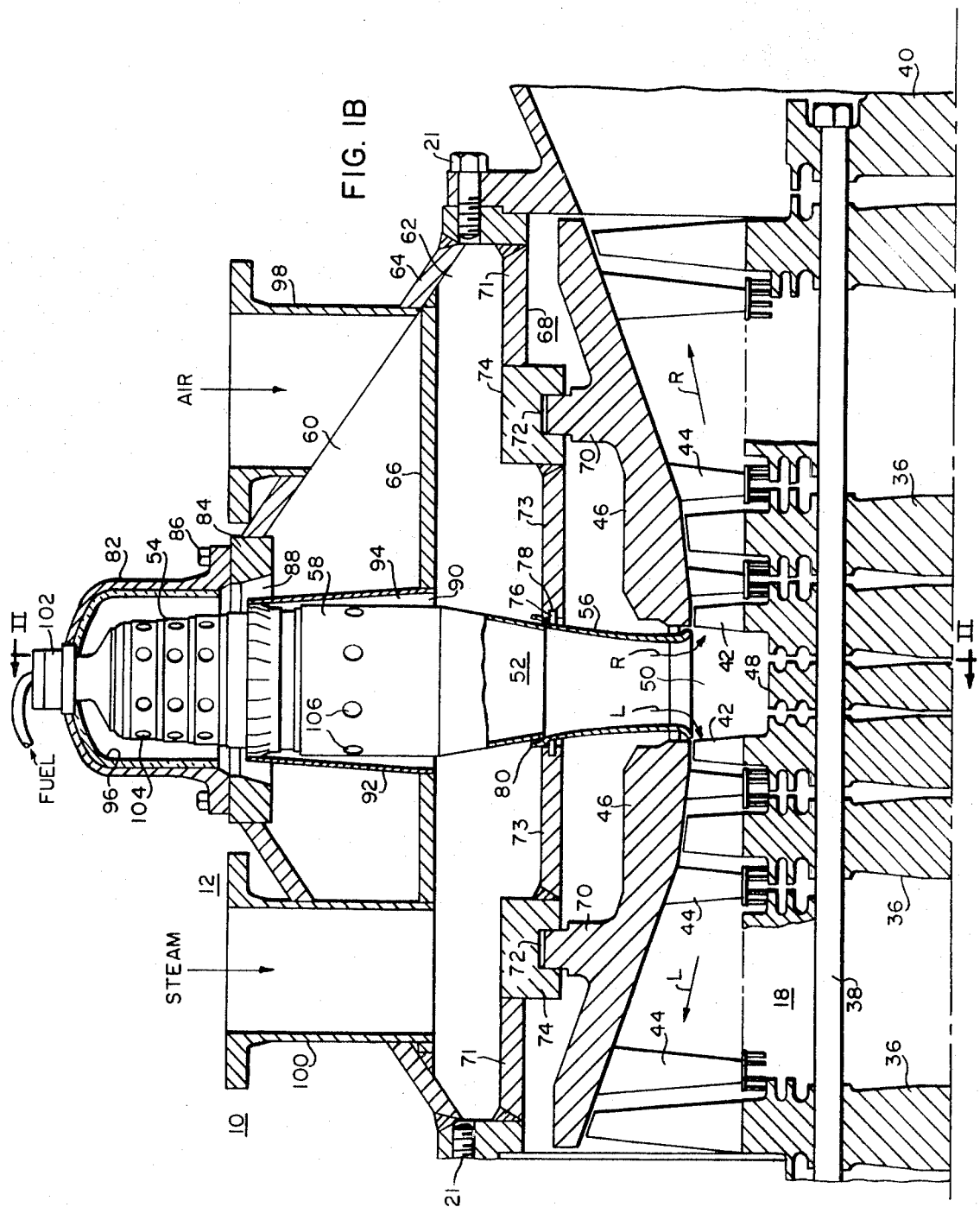

3,657,884

TRANS-NOZZLE STEAM INJECTION GAS TURBINE

BACKGROUND OF THE INVENTION

This invention relates, generally, to elastic fluid machines and, more particularly, to gas turbine power plants of the open-cycle type.

As well known in the art, a gas turbine power plant type of the open-cycle type comprises an air compressor driven by a turbine for pressurizing air which is directed into combustion apparatus along with combustible fuel for combustion, thereby providing hot pressurized gaseous products of combustion to motivate the turbine. The power developed by the turbine in excess of that required to drive the compressor is available to perform useful work.

Heretofore, in view of the metallurgical limitations of the combustion apparatus, the turbine components, and other elements in the region influenced by the hot combustion products, only about 20 percent of the compressed air has been utilized for combustion, and the remainder has been utilized to reduce the temperature of the combustion products from about 3,500° F. to a temperature level that the above components can safely withstand, about 1,500° F. to 2,000° F. Thus, prior gas turbine power plants have had a relatively high back work ratio and a relatively low output work ratio.

Prior schemes have been proposed to reduce the back work ratio by the injection of water or water and methanol mixtures into the air compressor to cool the air during compression and thereby reduce the amount of compressor power required to compress the air to the proper turbine inlet pressure. Although the above schemes are effective, the percentage by weight of water that can be absorbed to humidify the compressed air is relatively small, from 0.5 percent to about 2 percent, and the corresponding reduction in compressor power is likewise relatively small.

Other schemes have heretofore been proposed for increasing the cooling or quenching effect of the excess air delivered to the combustion apparatus by injecting vapor or vaporizable liquid, such as water or water and methanol mixtures, into the combustion apparatus. Here again, the percentage by weight of liquid or vapor to the compressed air is relatively small, from 0.5 to 5 percent. Also, use of the foregoing schemes has been generally limited to periods of short duration, such as in aviation gas turbine engines where occasional bursts of greater power are required.

Apparently, the use of the above-mentioned schemes has been limited for several reasons. First, with fluid injection the heat rate of the power plant increased in proportion to the rate of liquid injection, thereby reducing the thermal efficiency of the power plant. Second, the cost and added inconvenience of using liquid in the cycle of operation more than offset the greater power output capability of the power plant within the 5 water injection limit.

BRIEF SUMMARY OF THE INVENTION

In accordance with one embodiment of this invention, the fuel combustion chambers for a double-opposed flow gas turbine are arranged generally radially in a plane normal to the rotational axis of the turbine rotor shaft which extends through a generally annular casing having an outer annular chamber or plenum distributing compressed air to the primary zones of the combustion chambers and an inner annular chamber distributing a vapor, such as steam, to the secondary zones of the combustion chambers which extend through generally cylindrical walls defining the air and the steam chambers and supporting combined transition pieces and nozzles of the combustion chambers and also the turbine stator rings. The steam enters each combustion chamber after first flowing through a relatively narrow space between the combustor wall and a jacket surrounding each combustor, thereby imparting a relatively high velocity to the steam to effectively cool the combustor wall. A steam pressure higher than air pressure at the combustor may be utilized to improve steam mixing. In the combined transition piece and nozzle for each combustor the combustion products and steam mixture is accelerated to a velocity and turned in a direction that will fit a free vortex flow pattern suitable for entry into the first stage rotor blade row. A considerable part of the conversion to kinetic energy takes place after the gas mixture has left the nozzle throats. This provides the opportunity for additional mixing and mitigation of hot spots as well as pressure and velocity equalization thereby reducing blade excitation throughout the turbine.

BRIEF DESCRIPTION OF THE DRAWINGS

For a better understanding of the nature of the invention, reference may be had to the following detailed description taken in conjunction with the accompanying drawings, in which:

FIGS. 1A and 1B when combined end-to-end constitute a view, partly in longitudinal section and partly in elevation, of a portion of a double flow gas turbine embodying principal features of the invention;

DESCRIPTION OF THE PREFERRED EMBODIMENTS

Figure 2:
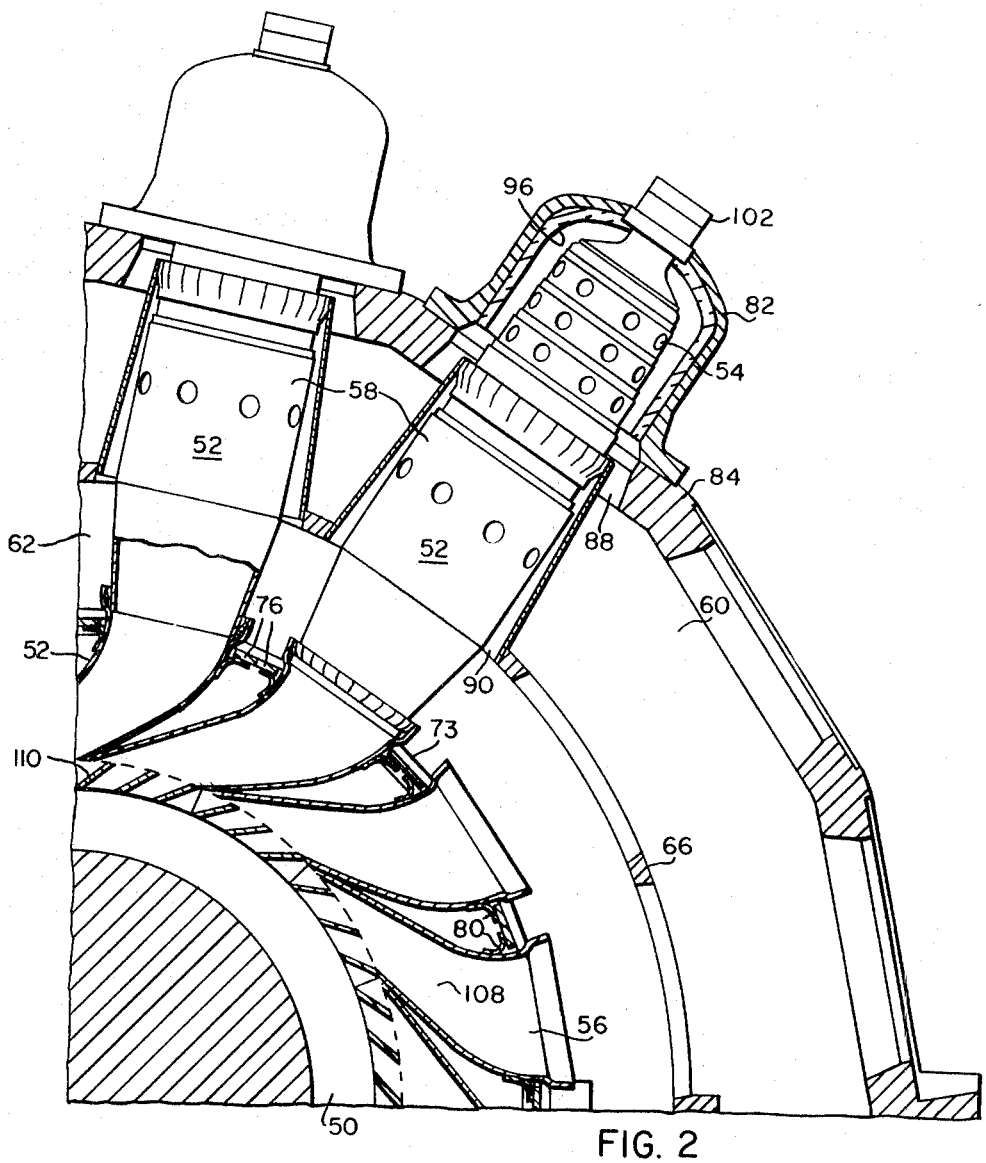
FIG. 2 is a quadrant view partly in elevation and partly in transverse section, taken generally along the line II—II in FIG. 1B.

Referring to the drawings, particularly to FIGS. 1 and 2, there is shown a portion of a gas turbine 10 which is of the central admission, double-opposed flow type. The turbine 10 comprises a generally annular casing 12 having a shaft 14 extending through the casing and rotatably mounted in suitable bearings disposed in a bearing housing 16. In accordance with the usual practice, a compressor (not shown) may be connected to one end of the shaft 14 and a power generator (not shown) may be connected to the other end of the shaft. The shaft 14 is driven by a turbine rotor 18 described more fully hereinafter.

A generally annular exhaust housing 20 is attached to the left-hand end of the turbine casing 12 by means of an annular row of bolts 21. A similar exhaust housing, only a portion of which is shown, is attached to the right-hand end of the casing 12 by bolts 21. The exhaust housing 20 comprises an outer wall 22 and an inner wall 24 spaced from the wall 22 to provide a generally annular exhaust passageway 26. An exhaust hood 28, of any suitable type, is attached to the exhaust housing 20. The products of combustion may be exhausted from the hood 28 to atmosphere in the usual manner. A circular array of vanes 30 may be provided in the exhaust hood 28 to turn the stream of exhaust gas in radially outward direction.

As described in U.S. Pat. No. 3,318,572, issued May 9, 1967 to A.J. Scalzo and assigned to the same assignee as this application, the bearing housing 16 is supported in concentric relation with the inner wall 24 of the exhaust housing 20 by means of an annular array of tangential strut members 32. Likewise, the inner wall 24 is supported by the outer wall 22 and an annular array of tangential strut members 34 is provided for this purpose. Since the manner of operation of these strut members is fully described in issued patents; it will not be described in this application.

As shown, the turbine rotor 18 is of the stacked type, and comprises a plurality of rotor wheels or discs 36 mounted on the shaft 14 and secured together by an annular array of bolts 38 extending through the discs 36 and end members 40. Each disc 36 carries an annular array of rotor blades 42 of the usual type. The rotor 18 is of the multi-stage type, with annular rows of stator vanes 44 disposed between annular rows of rotor blades 42. The stator vanes 44 are supported by stator rings 46. Energy for driving the rotor 18 is extracted from the motive fluid as it flows through the rotor blades in a manner well known in the art.

As explained hereinbefore, the present turbine is of the double-flow type. Thus, two first stage rows of rotor blades 42 are axially apaced on the shaft 14 by a spacing member 48 to provide an annular space 50 around the shaft 14. As shown by the arrows L and R in FIG. 1B, the motive fluid flows in opposite directions into the rotor blades 42 from the annular space 50.

In order to supply the motive fluid to the turbine, a plurality of combustion chambers or combustors 52 are arranged generally radially in a plane normal to the rotational axis of the shaft 14. The combustion chambers 52 are all substantially identical and of the canister type, each chamber having a primary zone 54 at its outer end, a combined transition piece and outlet nozzle 56 at its inner end and a secondary zone 58 between the primary zone and the transition piece. The nozzle 56 of each combustion chamber communicates with the annular space 50 around the shaft 14 between the opposed first stage rotor blades 42 to supply the motive fluid to the turbine rotor.

As explained hereinbefore, it is necessary to reduce the temperature of the combustion products in the combustion chambers to a temperature level that the components of the turbine structure can safely withstand. Heretofore, this has been typically accomplished by utilizing a large proportion of the compressed air from the compressor driven by the turbine to dilute and thus reduce the temperature of the combustion products. Therefore, prior gas turbine power plants have had a relatively high back work ratio and a relatively low output work ratio. In order to increase the output work ratio and decrease the back work ratio of the present turbine, provision is made for quenching or cooling the products of combustion by introducing a vapor, such as steam, into the secondary zone 58 of each combustion chamber.

As shown, the turbine casing 12 has a generally annular outer chamber 60 surrounding a generally annular inner chamber 62. The outer chamber 60 is defined by an outer wall 64 of the casing and a generally cylindrical wall 66 which separates the inner and outer chambers. The inner chamber 62 is defined by the wall 66 and a generally cylindrical wall 68. The combustion chambers 52 extend generally radially through said walls and are supported by a first cylindrical wall 66 and a second cylindrical wall 68. The turbine stator rings 46 are also supported by the wall 68. Each ring 46 has an annular projection 70 disposed in a groove 72 in a supporting ring 74 secured between offset portions 71 and 73 of the wall 68. The transition piece 56 of each combustion chamber is supported by a collar 76 disposed in a groove 78 in the portion 73 of the wall 68. A sealing member 80 is provided around the opening in the wall 68 through which the combustion chamber 52 extends.

A separate dome-shaped cap 82 is provided for each combustion chamber 52. The cap 82 is attached to a supporting ring 84 secured in the outer wall 64 of the casing, as by welding. The cap 82, as best shown in FIG. 1B, is attached to the ring 84 by bolts 86. Each combustion chamber 52 is generally circular in cross section and extends through an associated opening 88 in the ring 84 which is of a greater diameter than the diameter of the combustion chamber.

Likewise, the combustion chambers 52 extend through an associated opening 90 in the wall 66 which is of a greater diameter than the diameter of the combustion chamber. A frusto-conical jacket 92 surrounds each combustion chamber 52 within the outer chamber 60. The base of the jacket 92 is secured to the wall 66 and the top of the jacket is sealed around the combustion chamber. The volume of the space 94 between the jacket 92 and the combustion chamber is small relative to the volume of the combustion chamber for a purpose explained hereinafter. The inside surface of the cap 82 may be lined with insulation 96 for heat protection.

During operation of the turbine as viewed in FIG. 1B, compressed air from the compressor is admitted into the outer chamber 60 through a plurality of inlets 98, only plug of which is shown. Likewise, a vapor, such as steam, is admitted to the inner chamber 62 through a plurality of inlets 100. The steam may be supplied from a steam generator or other suitable source. A combustible fuel is admitted into the primary zone 54 of each combustion chamber through a fuel injection nozzle 102 attached to the cap 82. The compressed air enters the primary zone 54 through a plurality of perforations 104 in the wall of the combustion chamber to form a combustible mixture which is ignited by any suitable ignition means such as a spark dug (not shown), to form hot gaseous products of combustion. The steam enters the secondary zone 58 of the combustion chamber through a plurality of perforations 106 after having passed through the relatively narrow space 94 between the jacket 92 and the wall of the combustion chamber, thereby increasing the velocity of the steam. A rather high velocity is desired here to effectively cool the combustor wall.

Furthermore, a steam pressure significantly higher than air pressure at the combustor may be utilized to improve steam mixing. In this manner the steam is mixed with the combustion products in the secondary zone of the combustor.

Thus, the combustion products are diluted and cooled without interfering with the combustion process in the primary zone of the combustor.

In the combined transition piece and nozzle 56 the combustion products and steam mixture is accelerated to a velocity and turned in a direction that will fit a free vortex flow pattern suitable for entry to the first stage rotor blade rows. A considerable part of the conversion to kinetic energy takes place after the gas and steam mixture has left the nozzle throats 108, see FIG. 2. This provides the opportunity for additional inter-mixing and mitigation of hot spots as well as pressure and velocity equalization, thereby reducing blade excitation throughout the turbine.

As shown more clearly in FIG. 2, an annular row of stationary vanes 110 may be provided between the throats 108 of the nozzles and the annular space 50 around the shaft of the turbine. These vanes assist in tangentially directing the motive fluid into the annular space 50 from which it flows in opposite directions through the rotor blades 42.

Figure 3:
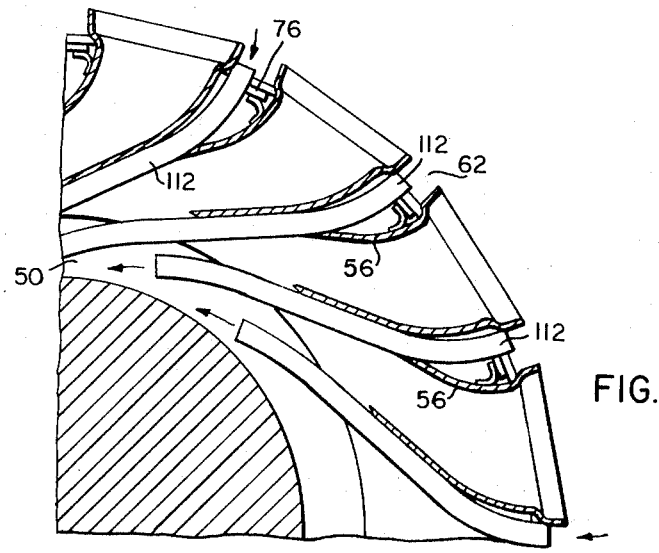
FIG. 3 is a view, similar to a portion of FIG. 2, showing a modified arrangement for cooling the turbine rotor.
Figure 4:
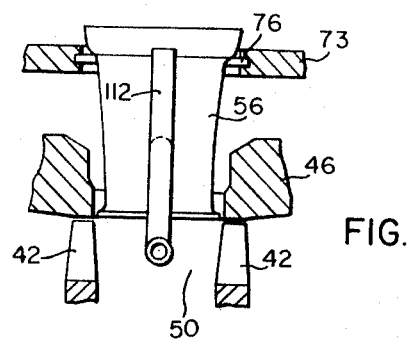
FIG. 4 is a view, partly in section and partly in elevation, of the modified arrangement shown in FIG. 3.

In the modification of the invention shown in FIGS. 3 and 4, provision is made for conducting vapor from the inner chamber 62 directly to the space 50 around the shaft 14 close to the hub to reduce the temperature at the center part of the rotor and also improve the temperature profile for the blading. As shown, this may be done by means of tubes 112 disposed between the nozzles 56 and supported by the collars 76 which support the nozzles. The tubes 112 extend from the chamber 62 into the annular space 50.

From the foregoing description it is apparent that the invention provides a gas turbine structure having numerous advantages over prior structures. Among these advantages are:

1. Cost reduction by elimination of the conventional first stage stator.
2. Ability to easily cool the combined transition piece and nozzle.
3. Reduction of hot spots on first stage stator vanes.
4. Reduces corrosion sensitivity of the turbine which normally is concentrated at the first stage stator vanes.
5. Simplifies seal problem between combustor and transition piece.
6. Eliminates seal problem between conventional transition and first stage stator.

In addition to the foregoing, thermal expansion movements of the trans-nozzle are not critical, since seals are only between stationary parts. The structural stability and integrity of the turbine casing are insured by symmetry and protection from heat. The cap arrangement offers a cost reduction by reducing the size of the turbine casing as well as improving its strength. The overall size reduction achieved with the present arrangement permits unitized construction which need not be dismantled for shipment in conventional present power output ratings.

I claim as my invention:

1. A double-opposed flow gas turbine, comprising
a generally annular casing having an outer annular chamber surrounding an inner annular chamber, a rotor shaft extending through said casing and having axially spaced rows of first rotor blades providing an annular space around the shaft, a plurality of combustion chambers arranged generally radially in a plane normal to the rotational axis of the shaft, each combustion chamber having a primary zone at its radially outer end and a combined transition piece and nozzle at its radially inner end and a secondary zone between the primary zone and the transition piece, said nozzles communicating with the space around the shaft between the first stage rotor blades, means admitting compressed air into the outer chamber for distribution under pressure to the primary zones of the combustion chambers, means admitting a vapor into the inner chamber for distribution to the secondary zones of the combustion chambers, and means admitting a combustible fuel into the primary zone of each combustion chamber.

2. The gas turbine defined in claim 1, wherein the vapor is steam.

3. The gas turbine defined in claim 1, wherein
the casing includes an outer wall defining the outside boundary of the outer chamber, a first generally cylindrical wall separating the inner and outer chambers, and a second generally cylindrical wall defining the inside boundary of the inner chamber.

4. The gas turbine defined in claim 3, wherein
the combustion chambers extend generally radially through said walls and are supported by said first and second walls.

5. The gas turbine defined in claim 3, including
turbine stator rings supported by said second wall.

6. The gas turbine defined in claim 4, including
a separate cap for each combustion chamber attached to the outer wall of the casing.

7. The gas turbine defined in claim 6, including insulation on the inside of each cap.

8. The gas turbine defined in claim 4, wherein
each combustion chamber is generally circular in cross section, said first wall has an opening therein for each combustion chamber of a greater diameter than the diameter of the chamber, and including a jacket surrounding each combustion chamber within said outer chamber to direct vapor from the inner chamber to the secondary zone of the combustion chamber.

9. The gas turbine defined in claim 8, wherein
the jacket is of a frusto-conical shape with its base attached to said first wall and its top attached to the combustion chamber.

10. The gas turbine defined in claim 9, wherein
the volume of the space between the jacket and the combustion chamber is small relative to the volume of the combustion chamber.

11. The gas turbine defined in claim 1, including
means for conducting vapor from the inner chamber directly into the space between the rows of first stage rotor blades.

12. The gas turbine defined in claim 11, wherein
the vapor conducting means includes tubes disposed between the nozzles of the combined transition pieces and nozzles.

* * * * *